Nov. 17, 1953     J. H. WHEELER     2,659,251
DRILL JIG
Filed Jan. 16, 1953

INVENTOR.
James H. Wheeler
BY
Hamilton + Hamilton
Attorneys.

UNITED STATES PATENT OFFICE 2,659,251

DRILL JIG

James H. Wheeler, Kansas City, Mo.

Application January 16, 1953, Serial No. 331,683

9 Claims. (Cl. 77—62)

This invention relates to new and useful improvements in drill jigs, and has particular reference to a drill jig of the type adapted for use in repetitive operations of drilling like work pieces in identical manner.

An important object of the present invention is the provision of a drill jig peculiarly adapted for very rapid, one-hand operation, and consists generally of the provision of a pliers-type hand grip operable to manipulate the work clamping jaws very rapidly, and so positioned as to be conveniently disposed for both gripping the work and also for positioning the jig on the bed of a drill press or the like during the drilling operation.

Another important object is the arrangement of the parts so as to hold the work with great accuracy, both as to a horizontal plane transverse to the drill axis, and as to tilting in said plane, and to prevent tilting or rocking of the jig on the drill press bed.

Other objects are simplicity and economy of construction, ease, speed, and convenience of operation, and adaptability to hold securely work pieces of irregular shapes.

With these objects in view, as well as other objects which will appear in the course of the specification, reference will be had to the drawing, wherein.

Figures 1, 2:
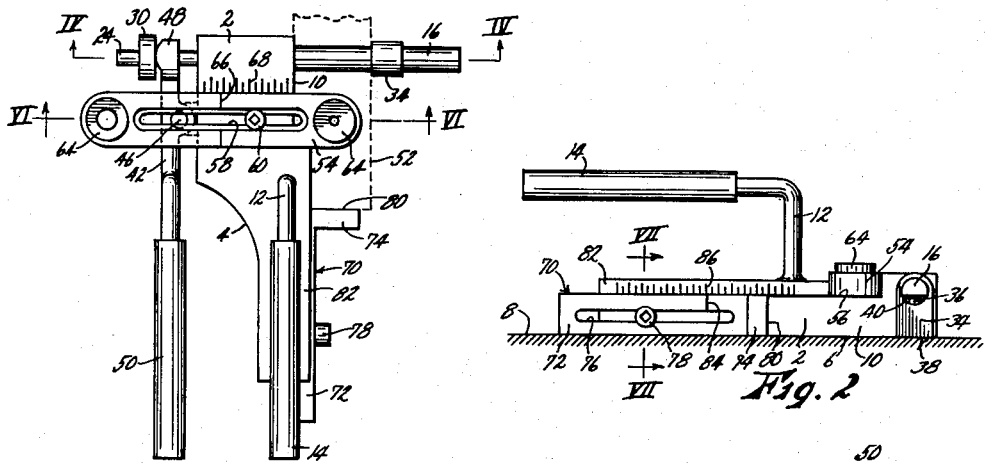
Fig. 1 is a top plan view of a drill jig embodying the present invention, with a work piece shown in operative relationship thereto in dotted lines.
Fig. 2 is a right side elevational view of the jig as shown in Fig. 1.

Like reference numerals apply to similar parts throughout the several views, and the numeral 2 applies to a body member having the form of a substantially rectilinear block having one corner portion thereof cut away, as indicated at 4. Said block has a planar base surface 6 adapted to rest flat on the bed 8 of a drill press or the like, and a work engaging surface 10 rising perpendicularly from said base surface, said work engaging surface constituting the longitudinal edge of said block opposite the cut away portion 4. A rod 12 is fixed to the upper surface of the body member, and extends upwardly and rearwardly therefrom, being provided with a handle 14 generally parallel to but spaced above surface 10.

Figures 3, 5:
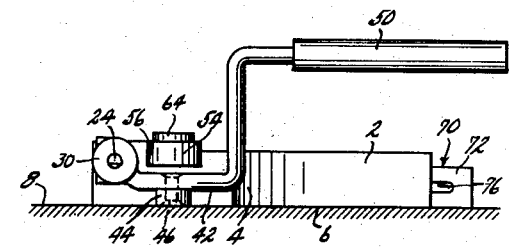
Fig. 3 is a left side elevational view of the device as shown in Fig. 1.
Fig. 5 is a fragmentary sectional view taken on line V—V of Fig. 4.
Figure 4:
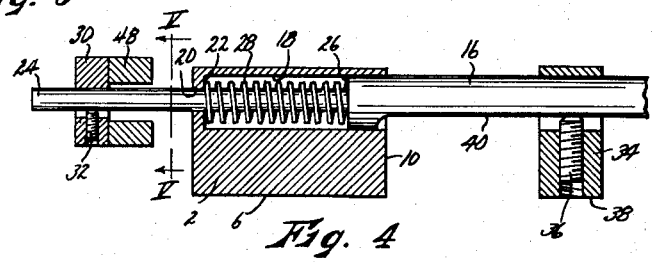
Fig. 4 is an enlarged fragmentary sectional view taken on line IV—IV of Fig. 1.
Figure 6:
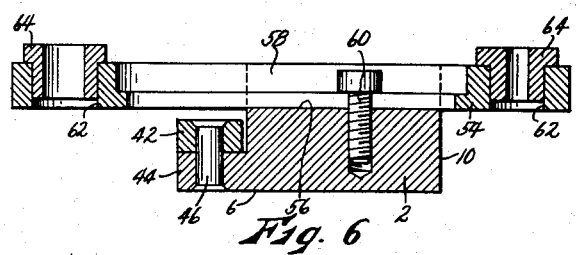
Fig. 6 is an enlarged sectional view taken on line VI—VI of Fig. 1.
Figure 7:
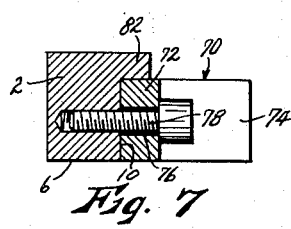
Fig. 7 is an enlarged sectional view taken on line VII—VII of Fig. 2.

Adjacent the forward end of the body member a shaft 16 is carried for longitudinal sliding movement in a bore 18 formed therefor in said body member, and is disposed perpendicularly to work engaging surface 10. At the end of the bore adjacent the side of the block opposite surface 10, said bore is reduced in diameter as at 20 (Fig. 4), thereby forming an internal shoulder 22 in said bore. Shaft 16 has a portion 24 extending slidably through the reduced portion of the bore, said reduction forming a shoulder 26 on the shaft within bore 18. A compression spring 28 disposed within bore 18 bears at its respective ends against shoulders 22 and 26, thereby urging the shaft outwardly from work engaging surface 10. It will be noted (Figs. 4 and 5) that the reduced portion 24 of the shaft is non-circular in cross-section, and the reduced portion 20 of the bore is correspondingly formed, thereby securing the shaft against rotation.

Shaft 16 is substantially longer than the width of body member 2, extending outwardly from both sides thereof. On the extending portion of the reduced shaft 24 a collar 30 is fixed by means of a set screw 32. On the opposite end portion of the shaft, which extends perpendicularly from work engaging surface 10, a block 34 is mounted for axial sliding movement, and is adjustably fixed thereon by set screw 36. Said block extends downwardly from the shaft, and the lower end surface 38 thereof is coplanar with the base surface 6 of the body member. The block is prevented from turning on the shaft by the fact that the shaft is flattened along its lower side, as at 40, and that set screw 36 engages said flattened portion.

A lever 42 extends along the side of body member 2 opposite work engaging surface 10, being pivoted intermediate its ends to a lug 44 integral with or fixed to said body member, by means of a pivot pin 46, said pin being disposed at right angles to surface 6 of the body member. At its forward end, said lever is formed to present a fork 48 (Fig. 5) which embraces reduced shaft portion 24 intermediate collar 30 and body member 2. Rearwardly of pivot 46, lever 42 is bent upwardly and then rearwardly and is fitted at its rearward end with a handle 50 which lies in the same general horizontal plane as handle 14, and is generally parallel thereto. It is apparent that the two handles in conjunction form a pliers-type hand grip operable with one hand by the operator. As they are drawn toward each other, fork 48 of the lever engages collar 30 and forces shaft 16 to the left, as viewed in Fig. 1, thereby moving block 34 toward work engaging surface 10 of the body member. A work piece 52 disposed between said block and surface 10 will thereby be securely gripped and held. It is apparent that by moving block 34 adjustably along shaft 16, the gripping means may be adapted to hold work pieces of a substantial range of widths, while preserving the spacing between handles 14 and 50 to a distance convenient to the operator.

A bar 54 is carried for longitudinal sliding movement in a groove 56 formed transversely in the upper surface of body member 2. Said bar has a longitudinal slot 58 formed therein for receiving a headed screw 60 which is threaded into the body member, whereby said bar may be fixed in said groove. Said bar has a hole 62 formed therethrough adjacent each end thereof, each of said holes being adapted to carry removably a drill bushing 64. Said drill bushings are customarily furnished in sets, and may be interchanged to provide a bushing having an internal diameter corresponding to the desired drill size. Holes 62 are of different diameters, and each will accommodate bushings of a certain range of internal diameters. The bar may be reversed to bring either end thereof over the work piece. The distance of the drill center from work engaging surface 10 of the body member is indicated by an index marker 66 imprinted on bar 54, which is read in connection with a suitable scale 68 imprinted on an adjacent portion of the top surface of the body member.

The positioning of work piece 52 in a direction transverse to bar 54 is gauged by an L-shaped guide 70, said guide comprising a leg 72 lying against work engaging surface 10 and extending parallel to base surface 6, and a leg 74 extending perpendicularly outwardly from surface 10. Leg 72 is longitudinally slotted as at 76 to receive a headed screw 78 threaded into body member 2, whereby said leg may be adjusted longitudinally on said body member. The forward face 80 of leg 74 engages the work piece 52. Body member 2 is provided with a lip 82 which overhangs and is disposed in sliding engagement with the upper surface of guide 70, thereby preventing the guide from rotating about screw 78. The spacing of guide surface 80 from the centerline of the drill bushing is indicated by an index marker 84 imprinted on the outer face of guide leg 72, which may be read in connection with a scale 86 imprinted on an adjacent surface of body member lip 82, as shown in Fig. 2.

The general operation of the device is believed evident. The operator first loosens clamp screws 60 and 78 and adjusts bar 54 and guide 70 until the work piece 52, positioned against surfaces 10 and 80, has the desired relationship to drill bushing 64, then tightens the clamp screws. The operator holds the device with one hand by means of the pliers-type hand grip 14—50, and positions work piece 52 in the jig with the other hand, then draws handles 14 and 50 together, whereby block 34 clamps the work piece firmly against surface 10. Then, still gripping handles 14 and 50, the operator rests the base surface 6 of the jig on the bed 8 of a drill press or the like, and the drill, not shown, is lowered through the drill bushing 64 to perform its function in the usual manner. The operations of clamping the work piece and positioning the jig on the drill press bed are performed with one hand, and very rapidly and efficiently.

It will be noted (Fig. 2) that the lower surface of lip 82, the lower surface of bar 54, and the lower flat surface 40 of shaft 16 are all coplanar in a plane parallel to base surface 6. This feature provides a top guide surface such that if the planar upper surface of a work piece is positioned thereagainst, perpendicularity between said work piece surface and the drill is assured. This feature is of course particularly useful when the work piece does not have a planar lower surface which can engage the drill press bed. Also, the bottom surface of guide member 70 and the bottom surface 38 of block 34 are coplanar with base surface 6 of the body member. This feature provides that all three of these surfaces may rest solidly on the drill press bed, and positively preclude any tilting of the jig on the drill press bed. In this connection, it will be noted that the points of contact of the guide, block, and body member with the drill press bed are disposed generally at the angles of a triangle including within its area the centerline of the drill bushing.

While I have shown and described a specific embodiment of my invention, it is apparent that many minor changes of construction and operation could be made without departing from the spirit of the invention as defined by the scope of the appended claims.

What I claim as new and desire to protect by Letters Patent is:

1. A drill jig comprising a body member having a planar base surface and a planar work-engaging surface rising perpendicularly from said base surface, a clamping block carried by said body member for movement toward and from said work-engaging surface, whereby a work piece may be clamped therebetween, manually operable means carried by said body member for moving said block, a bar carried for longitudinal adjustment by said body member and extending parallel to said base surface and outwardly from said work-engaging surface, a drill bushing carried by said bar, the axis thereof being perpendicular to said base surface, and a guide member carried by said body member for adjustable movement along said work-engaging surface in a direction parallel to said base surface, said guide member extending outwardly from said work-engaging surface.

2. A drill jig comprising a body member having a planar base surface and a planar work-engaging surface rising perpendicularly from said base surface, a clamping block carried by said body member for movement toward and from said work-engaging surface, whereby a work piece may be clamped therebetween, a first handle fixed to said body member, a second handle movably connected to said body member, said first and second handles forming in conjunction a pliers-type hand grip, an operative connection between said second handle and said clamping block, a bar carried for longitudinal adjustment by said body member and extending parallel to said base surface and outwardly from said work-engaging surface, a drill bushing carried by said bar, the axis thereof being perpendicular to said base surface, and a guide member carried by said body member for adjustable movement along said work-engaging surface in a direction parallel to said base surface, said guide member extending outwardly from said work-engaging surface.

3. A drill jig comprising a body member having a planar base surface and a planar work-engaging surface rising perpendicularly from said base surface, a clamping block carried by said body member for movement toward and from said work-engaging surface, whereby a work piece may be clamped therebetween, resilient means carried by said body member and urging said block away from said work-engaging surface, a first handle fixed to said body member, a second handle pivoted to said body member, said handles forming in conjunction a pliers-type hand grip, an operative connection between said second handle and said block whereby movement of said second handle toward said first handle will move said block toward said work-engaging surface, a bar carried for longitudinal adjustment by said body member and extending parallel to said base surface and outwardly from said work-engaging surface, a drill bushing carried by said bar, the axis thereof being perpendicular to said base surface, and a guide member carried by said body member for adjustable movement along said work-engaging surface in a direction parallel to said base surface, said guide member extending outwardly from said work-engaging surface.

4. A drill jig comprising a body member having a planar base surface and a planar work-engaging surface rising perpendicularly from said base surface, a clamping block carried by said body member for movement toward and from said work-engaging surface, whereby a work piece may be clamped therebetween, a shaft carried for longitudinal sliding movement by said body member, said shaft extending perpendicularly outwardly from said work-engaging surface and parallel to said base surface, a clamping block fixed on the extended portion of said shaft, resilient means carried by said body member and urging said shaft longitudinally outwardly whereby to move said block away from said work-engaging surface, a first handle fixed to said body member, a second handle pivoted to said body member, said handles in combination forming a pliers-type hand grip, an operative connection between said second handle and said shaft whereby movement of said second handle toward said first handle will move said block toward said work-engaging surface, a bar carried for longitudinal adjustment by said body member and extending parallel to said base surface and outwardly from said work-engaging surface, a drill bushing carried by said bar, the axis thereof being perpendicular to said base surface, and a guide member carried by said body member for adjustable movement along said work-engaging surface in a direction parallel to said base surface, said guide member extending outwardly from said work-engaging surface.

5. The structure as recited in claim 4 wherein the clamping block is adjustably movable along the shaft, whereby to maintain a predetermined spacing of the handles regardless of the width of the work piece held between said block and said work-engaging surface.

6. The structure as recited in claim 4 wherein the lower surface of the extended portion of the shaft and the lower surface of the extended portion of the bar are coplanar in a plane parallel to but spaced above the base surface of said body member.

7. The structure as recited in claim 4 wherein the lower surface of the block and the lower surface of said guide are coplanar with the base surface of said body member.

8. The structure as recited in claim 4 wherein the lower surface of the extended portions of the shaft and the bar are coplanar in a plane parallel to but spaced above the base surface of the body member, and the lower surfaces of the block and guide are coplanar with said base surface.

9. The structure as recited in claim 1 wherein the lower surfaces of the block and the guide are coplanar with the base surface of said body member.

JAMES H. WHEELER.

References Cited in the file of this patent

UNITED STATES PATENTS

| Number | Name | Date |
|---|---|---|
| 706,392 | Corliss | Aug. 5, 1902 |